US005126763A

United States Patent [19]

Atherton et al.

[11] Patent Number: 5,126,763

[45] Date of Patent: Jun. 30, 1992

[54] FILM COMPOSITE FOR ELECTROSTATIC RECORDING

[75] Inventors: David Atherton, North Kingstown; Surendra K. Gadodia, West Warwick; Morgan E. Gager, Warwick, all of R.I.

[73] Assignee: Arkwright Incorporated, Fiskeville, R.I.

[21] Appl. No.: 514,217

[22] Filed: Apr. 25, 1990

[51] Int. Cl.$^5$ ........ G01D 9/00

[52] U.S. Cl. ........ 346/135.1; 428/195; 428/323; 428/325; 428/328; 428/409

[58] Field of Search ........ 346/135.1; 428/195, 428/323, 325, 328, 409

[56] References Cited

U.S. PATENT DOCUMENTS

| | | | |
|---|---|---|---|
| 3,657,005 | 4/1972 | Brown, Jr. et al. | 346/135.1 |
| 4,241,134 | 12/1980 | Burwasser | 428/331 |
| 4,279,961 | 7/1981 | Fujioka et al. | 428/328 |
| 4,374,895 | 2/1983 | Yasuda et al. | 428/328 |
| 4,389,451 | 6/1983 | Fujioka et al. | 428/325 X |
| 4,416,963 | 11/1983 | Takimoto et al. | 430/69 |
| 4,420,528 | 12/1983 | Okiyama | 428/409 X |
| 4,430,382 | 2/1984 | Savit | 428/323 |
| 4,431,764 | 2/1984 | Yoshizumi | 524/409 |
| 4,752,522 | 6/1988 | Sugimori et al. | 428/323 X |
| 4,792,485 | 12/1988 | Konno | 428/327 |
| 4,795,676 | 1/1989 | Maekawa et al. | 428/328 |
| 4,840,842 | 6/1989 | Yamaguchi et al. | 428/323 |
| 4,904,526 | 2/1990 | Koskenmaki | 428/328 |

FOREIGN PATENT DOCUMENTS 1577968 10/1980 United Kingdom .

OTHER PUBLICATIONS

Patent Abstract of JP-A-63 40158, vol. 12, No. 249 (P-730) (3096), Jul. 14, 1988.

Patent Abstract of JP-A-58 68045, vol. 7, No. 156 (P-209) (1301) Jul. 8, 1983.

Patent Abstract of JP-A-60 33560, vol. 9, No. 157 (P-369) (1880) Jul. 2, 1985.

Patent Abstract of JP-A-58 72147, vol. 7, No. 164 (P-211) (1309) Jul. 19, 1985.

*Primary Examiner*—Benjamin R. Fuller
*Assistant Examiner*—Rundy W. Gibson
*Attorney, Agent, or Firm*—Birch, Stewart, Kolasch & Birch

[57] ABSTRACT

A multilayer polymeric film composite for use in the electrostatic recording process is disclosed. The film composite comprises an image receptive layer having a surface abrasivity of about 0.015 inch to about 0.085 inch and a surface roughness of about 30 to about 180 cc of air/minute, an electronically conductive layer and a supporting layer. A transport assisting layer can be coated on the side opposite to the imaging side to give a four layer film composite which provides the required friction and surface roughness to allow the film to be driven smoothly through the printing equipment. Control of the abrasivity and surface roughness of the image receptive layer is used to obtain excellent image quality. The film composite provides high image quality over a wide range of humidities and archival properties.

34 Claims, 2 Drawing Sheets

FILM COMPOSITE FOR ELECTROSTATIC RECORDING

BACKGROUND AND FIELD OF THE INVENTION

The present invention relates to a multilayer film composite for use in electrostatic or electrographic recording. This recording process is an important electronic non-impact printing technology which is now in wide use as a means for achieving both high speed recording and high quality images. Electrostatic printers or plotters are useful as output devices in computer-aided design, seismic recording, architectural design, and printed circuit design, among others.

Electrostatic recording is the process of producing an image in the form of an electrostatic charge pattern on a dielectric surface and subsequently developing that latent image by toning with oppositely charged black or colored powder, usually colloidally suspended in an insulating liquid.

In a typical writing or imaging process, a writing head, which contains two or more rows of densely spaced styli and a backplate or frontplate electrode, is selectively programmed by the plotter logic to place minute dot-spaced electrostatic charges in latent image form on the recording medium. This medium is designed to receive and hold an electrostatic charge pattern. After the latent image is electronically placed on the medium, the medium is exposed to a liquid toner. Black or colored particles suspended in the toner vehicle adhere to the medium only where a previous electrostatic charge was placed. Excess toner is removed from the medium by a vacuum channel or wiper bars and the medium is then dried by forced air, thereby fixing the image to the medium. This electronically produced print is often referred to as a hardcopy.

The most commonly used hardcopy media are paper, vellum and film. Each has its special requirements, and each has its special construction or design. This invention pertains to film and film-like surfaces for the electrostatic printing process.

Although various film recording media have been proposed for us with electrostatic recording plotters or printers, none of them has satisfied fully the substantial need in the art, particularly for the electrostatic recording devices such as the Benson (Océ Graphics) plotter, Versatec VS 3000 Series, 7000 Series, 8500 Series and 8500-HR Series plotters, CalComp 5700 and 5800 Series plotters and HP 7600 Series plotters. In fact, there are many deficiencies in the known products which have considerably limited their commercial utility.

The performance of conventional recording media is inherently moisture sensitive since the conductive layer of said media employs ionic moieties such as sulphonated polystyrene and dimethyl diallyl ammonium chloride. Thus, repeated images or lines (ghosting) and low density are obtained at humidities above 60% relative humidity (RH), and low image density results at humidities below 30%. This places an undesirable constraint on the operating environment. Water-soluble ionic moieties in the conductive layer cause bond failure and a resultant image layer breakup when the print is subjected to water. This water-sensitivity thus makes the conventional recording medium nonarchival.

Conventional recording media fail to provide fully satisfactory image quality, even at normal humidity conditions, i.e. 40–50% RH. Three main image defects which often are experienced in electrostatic recording are (1) flare which is randomly occurring bursts or explosions in plotter lines due to abnormal electrostatic discharge, (2) image breakup or dropouts which are irregular portions of missing image and (3) glitches which are irregular specks, zippers, or non-uniform images occurring in solid dark images due to irregularities in the dielectric surface of the media. Zippers, which are a common defect, are small horizontal lines which resemble a zipper seen in many recording films and are due to an electrical shorting of a stylus which causes loss of information across a small bank of multiplexed styli. While all three types of defects are undesirable, dropouts or image deletions are the most serious because of significant loss of information.

Furthermore, conventional recording media cannot transport reliably through the plotter, which results in inaccurate image rendition. This factor is very important where high accuracy plots are required such as in the aircraft industry. It is also important when multiple-color registration is required.

In spite of the many attempts that have been made to improve the qualities of the conventional recording media, none of the present commercial products is free from all these drawbacks.

The present inventors have discovered that a multilayer composite comprising an image-receptive layer having electrical, surface profile and abrasivity characteristics within specific ranges, an electronically conductive layer possessing conductivity within a specific range over a wide range of ambient humidity, a supporting layer with high dimensional stability and the ability to adhere to the adjacent layers, and, optionally, a layer which assists transport of the film through an electrostatic plotter can serve to overcome the above-mentioned drawbacks and perform in a manner that is superior to the films known in the art. This advance in the art results from finding that certain combinations of materials impart structural, electrical, chemical and physical properties to the resultant structure such that it is a superior electrostatic recording medium.

It is known in the art that an electrostatic recording medium must have a dielectric layer and a conductive layer, each conventionally defined, and, if neither provides the overall structural characteristics needed, a support layer. However, it also is known that this structure itself does not provide a good electrostatic recording medium. There is a major commercial need for a medium which not only satisfies this minimum requirement but which functions well under actual conditions of continuous use in a variety of devices at a wide range of humidities to provide an imaged product of high quality that can be used under practical conditions and that can be exposed to water without loss of archivability. Although this need is well known and a great deal of effort has been devoted to research and development in the field, a structure which satisfies such quality requirements and which can be produced economically has not been discovered previously. The balance of desirable properties achieved by certain structures against the consequent loss in other desirable properties has led to repeated failure of entirely rational design efforts because there are many requirements and they were not thoroughly understood either individually or in combination.

As a result of these and similar factors the current state of the art represents failure to discover the range of materials, structures and methods of producing them which can satisfy the clear need in the field. The present invention represents the discovery of such structures, the ranges of materials from which they can be assembled and methods for producing a high quality product.

SUMMARY OF THE INVENTION

The objective of the present invention is to provide a film composite which overcomes the above-mentioned drawbacks. This is attained by a multilayer film composite comprising (1) an image receptive layer, (2) an electronically conductive layer and (3) a supporting layer. The invention also provides a four layer film composite with good feeding properties comprising (1) an image receptive layer, (2) an electronically conductive layer, (3) a supporting layer and (4) a transport assisting layer.

The image receptive layer contains electrically resistive polymers and one or more types of particulates. The particulates are selected such that a balance in roughness and abrasivity is obtained. This balance is necessary to ensure minimal drop outs, flares and toner wipe-off when a print is made on an electrostatic plotter. The layer provides good dielectric properties and electric chargeability suitable for holding the latent image charge pattern.

The electronically conductive layer used in the recording medium of the present invention comprises a metal oxide, a metal halide or a doped form of one or more of these compounds dispersed in a polymer binder or alternatively an electronically conductive polymeric binder. The conductivity of the layer is functionally independent of moisture. This layer is also water-insoluble. These two properties are essential for archivability and for functionally stable and uniform electronic conductivity over a wide range of humidities. Almost no difference can be seen in images made using the films of this invention at 10% to 85% RH. In contrast, little or no image would be obtained with films comprising ionically conductive layers at these extreme humidities. In fact, poor images are obtained even outside the range of 30 to 60% RH with ionically conductive layers.

During coating of conventional dielectric films, drying of the coating solutions causes a loss of moisture from the conductive layer. Replacement of this moisture has to take place through the dielectric layer. This process can cause small breakdown areas in this layer, resulting in the zipper defect previously described. In the present invention, no remoisturization of the conductive layer is necessary, thus eliminating one of the major causes of zippers. Further, the elimination of the humidification step simplifies the manufacturing process. The supporting layer is a polymeric material which has suitable dimensional stability, transparency or opacity, tensile strength, adhesion characteristics, thermal stability and hardness. This supporting layer may include an adhesion-promoting coating or pretreat on one or both sides of said layer. A number of base film supports are available that serve this purpose, the most common of which is polyester film.

The transport-assisting layer comprises polymeric binders and pigments. This layer has good adhesion to the supporting layer and provides suitable friction and roughness characteristics to ensure that the film composite transports reliably through the recording device.

In a preferred embodiment of the invention, the film composite is comprised of an image receptive layer containing amorphous silica, crystalline silica and calcium carbonate particulates dispersed in a polymer matrix of polyvinyl butyral and polyacrylate, an electronically conductive layer containing a copolymer of methyl methacrylate-hydroxyethyl methacrylate and antimony doped tin oxide particles, and a supporting layer of polyethylene terephthalate. In another preferred embodiment, the film composite also includes a transport assisting layer on the side opposite to the imaging side, containing silica particulates and polymeric binders comprising melamine-formaldehyde resin, partially hydrolyzed polyvinyl acetate, and a quaternary salt of an acrylamide copolymer.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
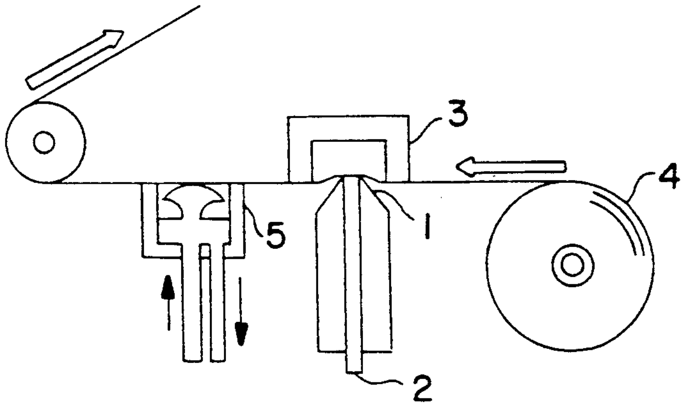
FIG. 1 shows a typical imaging system utilizing the recording medium of the present invention.

As shown in FIG. 1, in a typical writing or imaging process, a writing head 1, which can contain, for example, two rows of densely spaced styli 2 and a segmented backplate electrode 3, is selectively programmed by plotter logic to place minute dot-spaced electronic charges in latent image form on a recording medium 4. This medium is designed to receive and hold an electrostatic charge pattern. After the latent image is electronically placed on the recording medium, it is exposed to a toner material 5, for example, a liquid toner. Black or colored particles suspended in the toner vehicle adhere to the medium only where an electrostatic charge was applied. Excess toner is removed from the medium by a vacuum channel or wiper bars and the medium is then dried by forced air, thereby fixing the image to the recording medium and forming the hardcopy.

Figure 2:
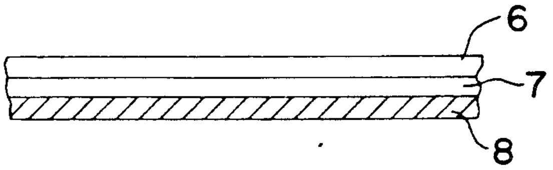
FIG. 2 shows a three component recording medium utilized in the present invention.
Figure 3:
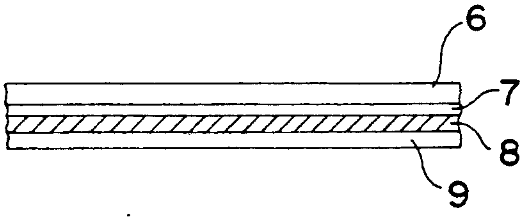
FIG. 3 shows a four component recording medium utilized in the present invention.

The film composite which is preferably used in the present invention comprises an image receptive layer 6, an electronically conductive layer 7 and a supporting layer 8 (FIG. 2). A transport-assisting layer 9 can be added on the side opposite to the imaging side to ensure reliable feeding through the recording device (FIG. 3). The multilayer configuration of the present film composite ensures high image qualities, archivability and good transport properties.

The image receptive layer of the present invention functions as a charge retentive layer and a writing electrode-cleaning layer. The blend of polymers and particulates in the image receptive layer provides desired surface qualities which govern the image qualities. The surface qualities are characterized by dielectric constant, dielectric strength, roughness, abrasivity, hardness and thermal characteristics. In order to overcome dropouts and provide low flare, it is necessary to balance surface roughness and abrasivity of the image receptive layer. Dropouts can be caused by a buildup of debris on the stylus head during recording. By providing film with a suitable abrasivity, it is possible to prevent this buildup. Surface roughness is often confused with abrasivity, and it can be shown that a rough surface with low abrasivity will still give image deletion due to dropouts. The recognition of this important difference and the independent control of roughness and abrasivity contributes substantially to the improved quality of the film of this invention.

The term abrasion is commonly used to refer to a process of wear in which there is displacement of material from a surface during relative motion against hard particles or protuberances, whereas surface roughness refers to unevenness of the surface.

Figure 4:
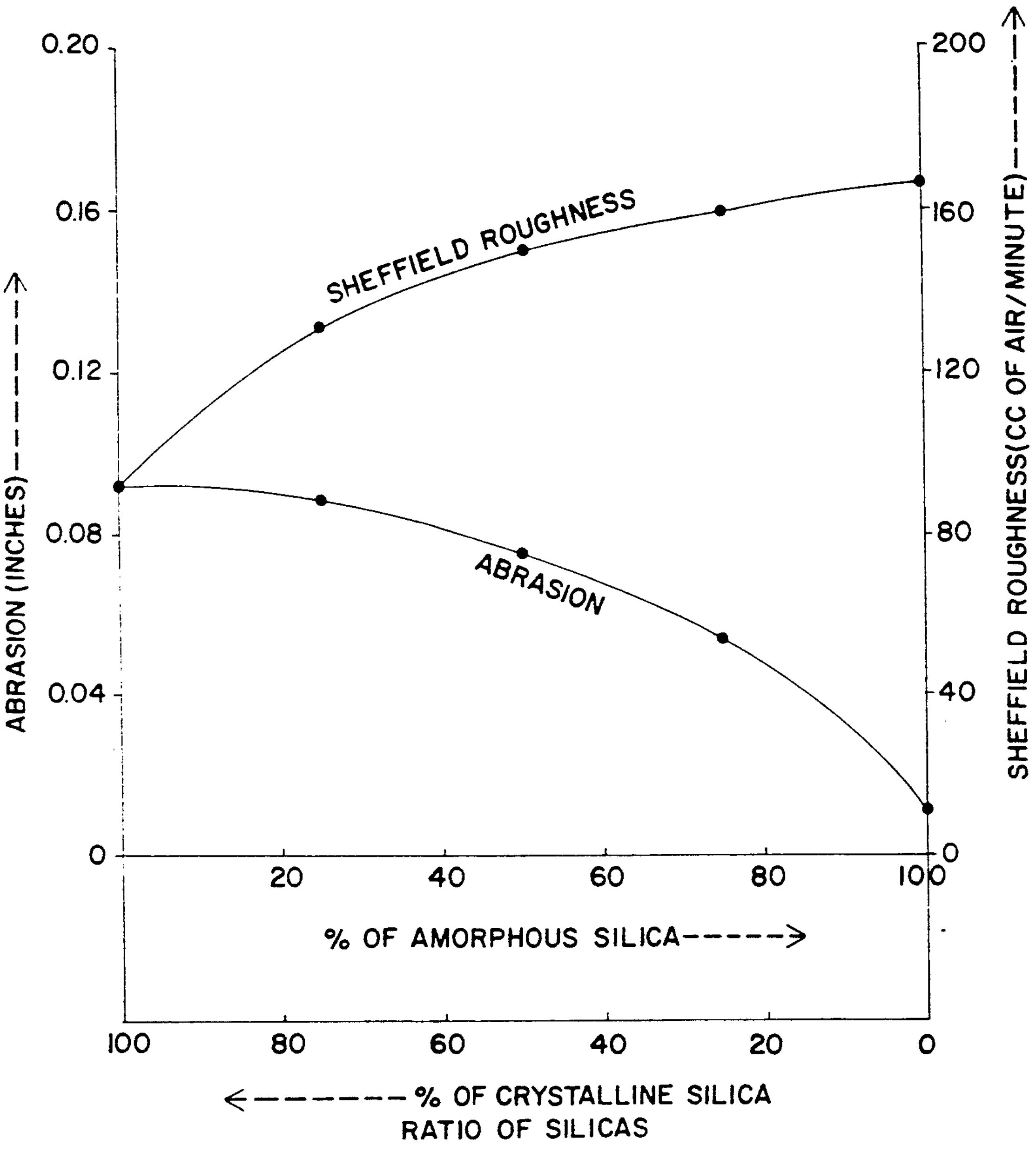
FIG. 4 illustrates that abrasivity and surface roughness can be independent parameters in a recording medium utilized in an imaging system.

As is clear from FIG. 4, surface roughness and abrasion are parameters that are not necessarily dependent on each other. In fact, in this particular example where a mixture of amorphous and crystalline silicas is employed, the surface roughness (units of cc air/minute) increases with an increase in the percentage of amorphous silica, whereas the abrasion (units of inch) decreases due to a decrease in the crystalline silica content. Dropouts become worse as abrasivity is decreased. Flares, on the other hand, become worse as the abrasivity is increased. Consequently, it is necessary to have the right blend of particulates to ensure that a balance between roughness and abrasivity is obtained, giving a dropout-free recording with low flares. The technique for measuring abrasivity is therefore important. A test method called the "Arkwright Abrasivity Tester" has been developed for this purpose which is described later.

A measure of roughness is necessary to provide good electrical discharge and subsequent toning of the film. The surface roughness also helps to prevent excess toner wipe-off of the image by the vacuum channel or other means used for removing excess toner from the film during the final stage of printing. Toner wipe-off of the image results in very low image density.

The image receptive layer determines the electrostatic charge accepted by the film composite and the time duration over which it will hold this charge. The polymers used for the image receptive layer should be electrically resistive and stable. Suitable dielectric materials include thermoplastic polymers such as polyesters, polyvinyl chloride, polyvinyl fluoride, nylon, polyvinyl acetate, cellulose acetate, acrylonitrile-butadiene-styrene polymers, polystyrene, polyurethanes, polyalkylacrylates, polyvinyl butyral and copolymers and blends thereof, and thermosetting polymers such as phenolic resins, melamine resins, epoxy resins and silicone resins. The dielectric constant (ASTM D150) of the polymer normally employed is in the range of about 1.5 to about 6.5 measured at 25° C. and 1 KHz and preferably 1.5 to 4.5. A value of dielectric constant below 1.5 imparts lower capacity to hold charge, thereby giving lower image density; whereas a value of dielectric constant above 6.5 tends to cause storage of excessive charges, thereby resulting in deleterious background.

The polymer binders used in the image receptive layer must have sufficient dielectric strength to support the charging current without breakdown. When breakdown does occur, a hole is actually burned in the layer and a circle of low charge is formed around the point of breakdown. These areas manifest themselves as white untoned spots normally with a dark center dispersed in the print.

The optimal surface roughness and abrasivity of the image receptive layer result from incorporating inorganic or polymeric particulates into the polymer binders. Although the exact mechanism by which they operate is not clearly understood, it can be postulated that these particulates are selected to serve several functions:

(1) The particulates function as a spacer which creates an ionization air gap between the image receptive layer and the writing electrode. For a given voltage, the Paschen curve defines the range of spacing between the image receptive layer surface and the writing electrode. An image receptive layer which provides an air gap distance outside of this range will not perform adequately. Therefore, the combined effect of the size of the particulates and the surface shape must provide a suitable gap. The combined effect can be quantified by a Sheffield reading of the surface roughness. The preferable average particulate size range is about 2 to about 15 microns.

(2) The particulates provide desired surface profile. Generally, a surface profile that is too low produces image break-up. A surface profile that is too high creates white-spotting (in solids and halftones) and also image break-up. It has been discovered that a suitable surface profile results when the particulate materials employed are required to provide a surface roughness of from about 30 to about 180 cc of air/minute as measured on a Sheffield smoothness tester, preferably from 60 to 150 cc of air/minute. The surface profile characteristic depends on the type of particulates employed and their concentration in the polymer binders.

(3) The particulates also clean the writing electrode to prevent image dropout. Due to the heat and other effects generated by discharge and friction with the writing electrode, extraneous matter often deposits onto the electrode head. Accordingly, cleaning of the writing electrode is usually necessary to prevent deterioration in recording characteristics. This is achieved by employing particulates of specified abrasivity. The control of abrasivity of the image receptive layer is essential. Too low an abrasivity will not prevent image dropout and too high an abrasivity causes excessive flare. It has been demonstrated that a minimum value of 0.015 inch is needed to attain dropout free recording, and that values above 0.085 inch result in excessive flare levels. Preferably, the image receptive layer has a surface abrasivity of from 0.03 to 0.07 inch.

The abrasivity is measured on an Arkwright abrasivity tester. The abrasivity testing device is a crockmeter (Model #CM1) obtained from Atlas Electric Devices Company. First, the samples are cut into 8 ½" by 11" pieces which are then humidified at 50% RH for one hour. A 3H pencil lead of at least 1 inch long, but not longer than 1.2 inches, is placed in a rubber holder in such a way that 3/16 inch of lead is extended beyond the rubber surface. The length of lead exposed is measured using a caliper. The rubber holder along with the lead is placed in a hole on the underside of the arm of the crockmeter. The preconditioned sample is then put on an abrasive pad of the crockmeter and the counter is set at zero. The handle of the crockmeter is then turned at a rate of approximately one revolution per second and the sample is simultaneously pulled with a slow, steady and straight back motion. The process is continued until the counter reads fifty. After this, the rubber holder with lead is removed from the arm of the crockmeter. The length of lead is again measured using the same caliper. This value of length is subtracted from the original value of length. The resulting value is expressed as abrasion in units of an inch. The abrasion value represents an average of five tests for each specimen.

Not all pigments are suitable to achieve the requisite abrasivity and roughness parameters in the present invention. The pigments may not be decomposed or fragmented by the imposed charge during the imaging process, nor cause electrical breakdown. Examples of inorganic or polymeric particulates suitable for the image receptive layer include amorphous silica, crystalline silica, alumina trihydrate, calcium carbonate, clays, aluminum silicates, polyolefin particulates, organic pigments and mixtures thereof. Because of the importance of clear film in many applications, it is necessary to keep a minimum haze, preferably in the range of 10 to 45 percent, as measured on Gardner Pacific's Hazeguard XL211. Thus, it is important to select pigments that give maximum clarity. Traditionally, on a paper medium, high concentrations of amorphous pigment are used, but this leads to high haze, making it inappropriate for use on a clear film medium. The choice of pigments to provide the balance of roughness and abrasivity is best determined by first measuring the abrasivity and roughness of the candidate pigments in the coating and then by selecting the most suitable to achieve the proper blend.

The particle size of the particulates is measured using a Malvern particle size analyzer. The surface roughness is measured on a Bendix Precisionaire Sheffield Smoothness instrument. The roughness value is measured by raising the testing head and placing an 8 ½"×11" sample on the glass plate and then slowly lowering the testing head in a gentle manner with no discernible impact due to downward motion of the head. The Sheffield roughness value can be obtained from the position of the float between red calibrating lines on the scale, once the float reaches a point of stability. The value is expressed as cc of air/minute. The higher the value, the rougher is the surface. The Sheffield roughness value represents an average of five tests for each specimen.

An appropriate amount of the particulates added to the polymer binders is within the range of about 5 wt% to 30 wt% and more preferably 15 wt% to 21 wt% by weight of particulate solids to polymer binders. The coating weight of the image receptive layer typically ranges from 1.5 grams-per square meter to 12 grams-per square meter, more specifically from 3 to 6 grams-per square meter.

The significant feature of the conductive layer in the present invention is that its electrical characteristics are functionally independent of moisture. In the conventional recording media, the conductive layer is ionically conductive which performs satisfactorily only in the presence of certain amounts of moisture. Best results are obtained at about 50% RH. Poor image quality is obtained outside the range of 30-60% RH. The carrier of the charge in such a medium comprises ions which can conduct charge appropriately only in the presence of moisture. Due to inherent water sensitivity of these ionic materials, a breakup in the image layer occurs when the print is subjected to water, making it nonarchival.

However, unlike conventional recording media, the conductive layer used in the present invention is electronically conductive. The dominant carriers in such a medium are electrons or "holes" instead of ionic moieties. Therefore, this type of layer contributes to archivability, functional stability and uniform electronic conductivity over a wide range of humidities. An important feature of the present invention is that the electronically conductive layer can be coated by one of the conventional coating methods instead of using expensive processes such as sputtering or vacuum deposition.

The electronically conductive layer contains at least one electronically conductive particulate in at least one polymer binder. The electronically conductive particulates that can be used in the electronically conductive layer are doped metal oxides such as doped tin oxide, doped indium oxide and doped zinc oxide and metal-containing semiconductors such as the metal halides CuI and AgI. Other suitable conductive particulates include those in which a nucleus such as $TiO_2$, $SiO_2$, ZnO or the like is covered by a conductive metal oxide such as antimony or fluorine doped tin oxide or the like. The electronic conductivity can also be achieved by using electronically conductive polymers such as polyacetylene, poly p-phenylene, poly p-phenylene sulfide and polypyrrole in their conductive forms.

Metal oxides used in the present invention are semiconductors such as doped tin oxide, indium oxide and zinc oxide. Among these metal oxides, doped tin oxide is found most suitable for use, from the viewpoint of opacity, color, cost and stability of conductivity. The dopants which can be used for tin oxide and zinc oxide are antimony, indium, phosphorus and fluorine, and the dopants used for indium oxide are antimony, phosphorus and fluorine. The concentration of the dopants usually is 0.5 to 20%. The doped metal oxide may be used on its own or on the surface of suitable clear, opaque or colored particulates.

When clear films are required, the conductive pigments should be of such size as to minimize light refraction. To have optimum transparency, the average particle size of the doped metal oxide should be about 0.2 micron or less. Acceptable transparency may be obtained with a somewhat larger particle size. If a white, opaque electronically conductive layer is desired, then it is also possible to use an electroconductive pigment consisting of a nucleus of $TiO_2$ with a chemical surface treatment of doped tin oxide.

In order to obtain a conductive layer with a surface resistivity ranging from about $1\times10^6$ ohms/sq to $1\times10^8$ ohms/sq at 25° C., the ratio of metal oxide to polymer binder should be about 5:1 to about 1:1, preferably from about 3:1 to about 1.5:1. Some of the newer printer-plotters with no multiplexing can use conductive layers with a surface resistivity below about $1\times10^2$ ohms/sq. Thus, for such machines the lower resistivity limit can be extended.

As the binder polymers for the electronically conductive layer, thermoplastic resins or thermosetting resins employed in conventional coatings, such as acrylic resins, vinyl acetate resins, vinyl chloride resins, carbonate resins, protein binders, polyester resins, styrene resins and copolymers of said polymers can be suitably used. Polyester resins and copolymers of methyl methacrylate and hydroxyethyl methacrylate (composition of 50:50 to 98:2) are most preferable from the standpoint of providing a layer having excellent transparency and good electronic conductivity.

A preferred embodiment of the electronically conductive layer using doped tin oxide has a pigment to binder ratio of 3:1 to 1.5:1 and has a coating weight of 0.25 to 5.00 gm/sq meter. The resin used is a copolymer of methyl methacrylate and hydroxyethyl methacrylate. The coating weight of the conductive layer may vary greatly depending upon the required conductive effect, required coating film strength, pigment to binder ratio, and other requirements, but generally it is in the range Of 0.5 gram-per square meter to 3 grams-per square meter.

The supporting layer of the present invention is a polymeric material which has suitable dimensional stability, transparency or opacity, tensile strength, adhesion characteristics, thermal stability and hardness. Suitable polymeric materials for use as a supporting layer are transparent or opaque thermoplastic polymers, including polyesters, polysulfones, cellulose acetate, polycarbonates, polystyrene, polyimides, polyolefins, poly(methyl methacrylate), cellulose esters such as cellulose acetate and others. A polyethylene terephthalate polyester film is particularly preferred. The thickness of the layer is not particularly restricted, but typically is in the range of about 2 to 10 mils, preferably about 3.0 to about 5.0 mils. The supporting layer may be pretreated to enhance adhesion of the polymeric coating thereto.

The transport-assisting layer of the multi-layer film composite is placed on the side opposite to the imaging side. This is done to provide appropriate friction and surface roughness to allow the film to be driven through the recording device in a smooth fashion, that is, without slip-sticking. Without this layer, inconsistent film feeding often occurs through the device and results in loss of dimensional accuracy.

The coefficients of static and dynamic friction of the transport-assisting layer are measured against itself using an Instron tensile tester (Model #1120) in accordance with ASTM D1894-78. The static friction refers to the resistance offered by the surface for initiating the relative motion of an object under the influence of external force, whereas the dynamic friction refers to the resistance offered by the surface to an object while the object is in motion relative to the surface. The values of coefficient of static and dynamic friction can be obtained from the recording output of the instrument. The first long spike on the chart is a measure of the coefficient of static friction whereas the average of the remaining high peaks and low peaks is a measure of the coefficient of dynamic friction.

In addition to friction, the surface roughness also plays an important role in the smooth feeding of film through the printer. The transport assisting layer includes a small percentage of particulates which act as spacers. These spacers help to reduce the drag of the film through the electrographic printer and thereby ensure smoother feeding.

The coefficients of friction, the nature of the friction curve and surface roughness of the transport assisting layer determine the transport property. The phenomena of slip-stick refers to a stepwise movement during film transport as contrasted with a continuous movement and is a function of the foregoing factors.

The coefficients of static and dynamic friction are, respectively, in the range of 0.25 to 0.75 and 0.20 and 0.70 units. The average peak-to-valley distance of the dynamic peaks is preferably below 0.15 unit. The Sheffield surface roughness of the transport assisting layer is in the range of 10 to 100 cc of air/minute and preferably in the range of 15 to 65 cc of air/minute. The appropriate friction values, surface roughness and surface profile will ensure a continuous, smooth transport in contrast to a stepwise transport. It is the lack of recognition of the need for a controlled surface friction and roughness that is responsible for the poor performance of some products in the market. Preferably, the transport assisting layer is made anti-static to avoid the development of spurious charges and to assist in smooth transport through the plotter.

The clear transport-assisting layer contains polymer binders, inorganic or polymeric particulates, and/or conductive moieties. The ratio of polymer binder to particulates preferably should be about 100:1 to about 166:1 by weight, but will function at a lower ratio but at a loss of transparency. The transport-assisting layer has a surface resistivity of about $1\times10^{6}$ to about $1\times10^{13}$ ohms/sq at 25° C. and 50% RH.

The CAD, CAM industry often requires a matte finished medium on which additional manual drafting with pen and pencil can be done. This type of matte coating is well known in the art and consists of suitable ink receptive resins, together with pigments which provide an abrasive surface with enough tooth to produce pencil images. Because of its pigmented drafting surface, this type of matte coating is useful as a transport layer.

The polymers used as binders in the transport-assisting layer include acrylic resins, vinyl acetate resins such as hydrolyzed polyvinyl acetate, vinyl chloride resins, cellulose acetate butyrate resins, cellulose acetate propionate resins, carbonate resins, polyester resins, urethane resins, epoxy resins, melamine-formaldehyde resins and styrene resins. Preferred polymer binders useful in the coating composition of the invention are melamine-formaldehyde resins and 15–75% hydrolyzed polyvinyl acetate. The polymeric binder can be crosslinked using acids as catalysts such as benzoic acid, p-toluene sulphonic acid, n-butyl phosphoric acid, amine salts of carboxylic acids and alkyl sulphonic acids. The particulates that can be used in the transport assisting layer include amorphous silica, crystalline silica, calcium carbonate and polyolefin, either singly or in combination.

The conductive property of the transport-assisting layer is introduced by doped metal oxides or ionic conductive polymers. Preferred examples of conductive agents used in the invention include tin oxide doped with antimony, indium, phosphorus or fluorine, sulfonated polystyrene resin, quaternized cellulose ether, quaternized acrylics such as quaternary salts of diacetone acrylamide copolymer resins, and the like.

When a clear film composite is desired, it is essential t disperse the electronically conductive pigment in the conductive lacquer so as to obtain a transparent conductive coating. Dispersion of said pigment is also required to obtain the requisite electrical conductivity. Dispersion refers to the complete process of incorporation of powdered pigments into the liquid medium so that the final product consists of fine pigment particle distribution throughout the medium. Commercially available doped tin oxide is specified to have a particle size in the range of 0.02 to 0.10 micron. However, it is possible that these particles agglomerate during storage. It is therefore essential to disperse these types of pigments so as to deagglomerate the particles to their original particle size. The submicron size particles can be obtained by dispersing the lacquer in dispersing equipment such as a ball mill, sand mill, bead mill, or similar type of dispersing equipment.

The supporting layer is first coated with the electronically conductive coating using the Meyer rod technique and dried in an air dried oven at a temperature range of 100° to 150° C. for about 4 minutes to 2 minutes. The image receptive layer is then applied over the conductive coating using the same techniques and dried at a temperature range of 80° to 120° C. for about 2 minutes to 1 minute.

The transport-assisting layer may then be placed on the opposite side of the supporting layer using the Meyer rod technique and dried at a temperature range of 120° to 150° C. for 4 minutes to 2 minutes.

The multilayer film then can be striped on the image receptive layer along the edges using conventional conductive black ink which is common in the industry. This is needed to ground excess background charge during recording.

Any of a number of methods may be employed in the production coating of the individual layers in the film composite, such as roller coating, wire-bar coating, dip-coating, air-knife coating, slide coating, curtain coating, doctor coating, flexographic coating, or gravure coating. Such techniques are well known in the art.

The film composite having a multi-layer configuration in accordance with the present invention has unique surface and electrical characteristics. The present film composite features good image formation, archivability, reliable handling, and a minimum of image dropouts, zippers and flare. It performs well over a wide range of humidities.

The following examples are further illustrative of the present invention but are by no means limitative of the scope thereof.

EXAMPLE I

An electronically conductive lacquer of the following composition is prepared:

| | |
|---|---|
| Copolymer of methyl methacrylate-hydroxyethyl methacrylate (Ratio 78:22) | 18.23 parts |
| Antimony doped tin oxide (8.6 percent antimony content) | 11.48 parts |
| Methyl ethyl ketone | 63.90 parts |
| Methyl carbitol | 6.39 parts |

Antimony doped tin oxide is premixed with methyl ethyl ketone and methyl carbitol for 5 minutes. The copolymer of methyl methacrylate-hydroxyethyl methacrylate is then added to the premix and mixed for another 5 minutes. This premix is then dispersed using dispersing equipment for one hour. The lacquer is then coated on a 4 mil thick transparent polyethylene terephthalate film using a Meyer rod and dried in an air dried oven at 125° C. for 2 minutes. This gives a transparent conductive coating with a surface resistivity of about $2\times10^6$ ohms/square.

An image receptive layer of the following composition is then coated on the electronically conductive layer.

-continued

| | |
|---|---|
| Toluene | 40.04 parts |
| Methyl ethyl ketone | 40.04 parts |
| Acrylic copolymer (55%) (DeSoto Incorporated) | 8.65 parts |
| Amorphous silica (Av. particle size 8.4 microns) | 0.43 parts |
| Crystalline silica (Av. particle size 4.7 microns) | 0.65 parts |
| Calcium carbonate (Av. particle size 3.8 microns) | 1.43 parts |
| Polyvinyl butyral (Monsanto Company) | 8.76 parts |

The lacquer is made by mixing toluene, methyl ethyl ketone and the acrylic copolymer for 10 minutes. Amorphous silica, crystalline silica, calcium carbonate and polyvinyl butyral are then added and mixed for 30 minutes under a high speed Cowles mixer.

The lacquer is applied to the previously coated film using a Meyer rod and dried at 90° C. for 2 minutes.

The transport assisting layer of the following composition can then be coated on the side opposite to the electronically conductive layer and image receptive layer of polyethylene terephthalate film.

| | |
|---|---|
| Methyl Cellosolve | 36.92 parts |
| Methanol | 38.89 parts |
| Quaternary salt of diacetone acrylamide copolymer (Calgon Corporation) | 3.53 parts |
| 35% Hydrolyzed polyvinyl acetate (35% vinyl alcohol and 75% vinyl acetate) | 11.92 parts |
| Melamine-formaldehyde (Reichhold Chemicals Inc.) | 6.59 parts |
| Amorphous silica (Av. particle size 8.4 microns) | 0.06 parts |
| Acid Catalyst | 2.10 parts |

The lacquer is prepared by mixing methyl cellosolve, methanol and diacetone acrylamide copolymer for 5 minutes. To the solution, 35% hydrolyzed polyvinyl acetate, melamine-formaldehyde and amorphous silica are added and mixed for another 20 minutes. The catalyst is then added and mixed for 2 minutes. The lacquer is coated using a Meyer rod on the side opposite to the electronically conductive layer and image receptive layer on the polyethylene terephthalate film and dried at 120° C. for 2 minutes. The coated film is then striped with a conductive ink on the image receptive layer of the film.

The coated film is printed on a Versatec V7436 electrostatic plotter. Excellent print density with a very low level of flare, no dropouts and no toner wipe off is obtained.

The haze level of this clear coated film is 36 percent. The Sheffield surface roughness and abrasivity of the coated film are 95 cc of air/minute and 0.047 inch, respectively.

In contrast, a similar film is made with the only difference being that the image receptive layer does not contain any crystalline silica. The amount of amorphous silica is increased to compensate for the absence of crystalline silica. The Sheffield roughness and abrasiveness of the film are 120 cc of air/minute and 0.002 inch, respectively. The haze level of the coated film is 40 percent. When the film is printed on a V7436 electrostatic printer, severe dropout in the print is observed.

EXAMPLE II

Another electrographic film of the following composition is prepared in the same manner as in Example I.

| | |
|---|---|
| The image receptive layer | |
| Methyl ethyl ketone | 38.66 parts |
| Toluene | 38.66 parts |
| Acrylic copolymer (55%) (DeSoto Incorporated) | 8.77 parts |
| Amorphous silica (Av. particle size 8.4 microns) | 0.53 parts |
| Crystalline silica (Av. particle size 4.7 microns) | 2.10 parts |
| Polystyrene (Hercules Incorporated) | 5.64 parts |
| Polyvinyl butyral (Monsanto Company) | 5.64 parts |
| The electronically conductive layer | |
| Toluene | 56.12 parts |
| Isopropyl alcohol | 9.90 parts |
| Polyethylene terephthalate resin (Goodyear Tire & Rubber) | 6.32 parts |
| Titanium dioxide, surface treated with antimony doped tin oxide (10 percent antimony content) | 27.66 parts |
| The supporting layer | |
| White opaque polyethylene terephthalate | |
| The transport-assisting layer | |
| Methyl Cellosolve | 36.92 parts |
| Methanol | 38.89 parts |
| Quaternary salt of diacetone acrylamide copolymer (Calgon Corporation) | 3.53 parts |
| 35% hydrolyzed polyvinyl acetate (35% vinyl alcohol and 75% vinyl acetate) | 11.92 parts |
| Melamine-formaldehyde (Reichhold Chemicals Inc.) | 6.59 parts |
| Amorphous silica (Av. particle size 8.4 microns) | 0.06 parts |
| Acid Catalyst | 2.10 parts |

This film has a Sheffield roughness of 130 cc of air/minute and abrasiveness of 0.070 inch. The film, when printed, has good print density and no dropouts.

EXAMPLE III

Another electrographic film is prepared in the same manner as in Example I using the following components:

| | |
|---|---|
| The image receptive layer | |
| Toluene | 43.84 parts |
| Methyl ethyl ketone | 43.84 parts |
| Polyvinyl butyral (Monsanto Company) | 10.56 parts |
| Amorphous silica (Av. particle size 8.4 microns) | 0.35 parts |
| Crystalline silica (Av. particle size 4.7 microns) | 1.41 parts |
| The electronically conductive layer | |
| Methyl ethyl ketone | 65.48 parts |
| Copolymer of methyl methacrylate-hydroxyethyl methacrylate (Ratio 78:22) | 17.86 parts |
| Melamine-formaldehyde resin (American Cyanamid) | 1.86 parts |
| Antimony doped tin oxide (8.6 percent antimony content) | 14.88 parts |
| The supporting layer | |
| Transparent polyethylene terephthalate | |
| The transport-assisting layer | |
| Methyl Cellosolve | 36.92 parts |
| Methanol | 38.89 parts |
| Quaternary salt of diacetone acrylamide copolymer (Calgon Corporation) | 3.53 parts |
| 35% hydrolyzed polyvinyl acetate | 11.92 parts |

-continued

| | |
|---|---|
| (35% vinyl alcohol and 75% vinyl acetate) | |
| Melamine-formaldehyde (Reichhold Chemicals Inc.) | 6.59 parts |
| Amorphous silica (Av. particle size 8.4 microns) | 0.06 parts |
| Acid Catalyst | 2.10 parts |

The Sheffield roughness and the abrasivity are 113 cc of air/minute and 0.065 inch, respectively. The haze level of the coated film is 33 percent. The film, when printed on a Versatec V7436 printer, gives good print density and no dropouts but with slightly more flares than Example I.

The invention being thus described, it will be obvious that the same may be varied in many ways. Such modifications as would be obvious to one skilled in the art are intended to be included within the scope of the following claims.

We claim:

1. A multi-layered polymeric film composite for use in an electrostatic or electrographic recording process comprising:

an image receptive layer having a surface abrasivity of 0.015 inch to 0.085 inch, a surface roughness of 30 to 180 cc of air/minute/ an electronically conductive layer containing at least one electronically conductive particulate in at least one polymer binder; and a supporting layer, said image receptive layer being disposed on said electronically conductive layer which is, in turn, disposed on said supporting layer.

2. A film composite according to claim 1, further comprising a transport-assisting layer on the side opposite to the imaging side of the film.

3. A film composite according to claim 1, wherein the electronically conductive particulate is a doped metal oxide.

4. A film composite according to claim 1, wherein the electronically conductive particulate is a metal halide.

5. A film composite according to claim 1, wherein the electronically conductive particulate comprises a nucleus which is covered by a conductive metal oxide.

6. A film composite according to claim 1, 2, 3, 4 or 5, wherein the image receptive layer contains polymer binders and particulates, and possesses a dielectric constant of 1.5 to 6.5 measured at 25° C. and 1 KHz.

7. The film composite according to claim 6, wherein said polymer binders in the image receptive layer are selected from the group consisting of polystyrene, polyacrylates, polyvinyl butyral, polyvinyl acetate, polyesters, acrylonitrile-butadiene-styrene polymers and copolymers and blends thereof.

8. The film composite according to claim 6, Wherein said particulates in the image receptive layer are selected from the group consisting of amorphous silica, crystalline silica, calcium carbonate, alumina trihydrate, polyolefin particulates, clays, aluminum silicates and mixtures thereof.

9. A film composite according to claim 1, 2, 3, 4 or 5, wherein the electronically conductive layer possesses a surface resistivity of $1 \times 10^2$ to $1 \times 10^8$ ohms/sq.

10. The film composite according to claim 9, wherein the polymer binder for the electronically conductive particulate is selected from the group consisting of copolymers of methyl methacrylate-hydroxyethyl methacrylate, polyester resins, acrylic resins, vinyl chloride resins, vinyl acetate resins, melamine-formaldehyde resins and phenol-formaldehyde resins.

11. The film composite according to claim 9, wherein the electronically conductive particulate is:

tin oxide doped with antimony, phosphorus, indium or fluorine;

indium oxide doped with antimony, phosphorus or fluorine;

zinc oxide doped with antimony, phosphorus, indium or fluorine;

cuprous iodide or silver iodide.

12. The film composite according to claim 9, wherein the electronically conductive particulate is a titanium dioxide, silica or zinc oxide nucleus covered with an antimony doped tin oxide.

13. The film composite according to claim 9, wherein the electronically conductive particulate is a titanium dioxide, silica or zinc oxide nucleus covered with an fluorine doped tin oxide.

14. The film composite according to claim 9, wherein the electronically conductive particulate is tin oxide doped with antimony, indium, fluorine or phosphorus.

15. The film composite according to claim 9, wherein the electronically conductive particulate is tin oxide doped with antimony.

16. The film composite according to claim 9, wherein the electronically conductive particulate is tin oxide doped with fluorine.

17. The film composite according to claim 1, 2, 3, 4 or 5, wherein the supporting layer is a transparent or opaque polyethylene terephthalate, polyolefin, polystyrene, polycarbonate or cellulose acetate.

18. The film composite according to claim 2, wherein the transport-assisting layer comprises polymer binders, conductive agents and particulates, said transport-assisting layer having a coefficient of static and dynamic friction in the range of 0.25 to 0.75 and 0.20 to 0.70 units, respectively, and a surface roughness of 10 to 100 cc of air/minute and a surface resistivity of $1\times10^6$ to $1\times10^{13}$ ohms/sq. at 25° C. and 50% RH.

19. The film composite according to claim 18, wherein said polymer binders in the transport-assisting layer are selected from the group consisting of hydrolyzed polyvinyl acetate resins, melamine-formaldehyde resins, cellulose acetate propionate resins and cellulose acetate butyrate resins.

20. The film composite according to claim 18, wherein said conductive agents in the transport-assisting layer are selected from the group consisting of doped metal oxides, quaternary salts of diacetone acrylamide copolymer resins and sulfonated polystyrene resins.

21. The film composite according to claim 18, wherein said particulates in the transport-assisting layer are selected from the group consisting of silica and calcium carbonate.

22. A film composite according to claim 2, wherein the image receptive layer comprises amorphous silica, crystalline silica and calcium carbonate particulates dispersed in a polymer matrix of polyvinyl butyral and polyacrylate;

the electronically conductive layer comprises a copolymer of methyl methacrylate-hydroxyethyl methacrylate and antimony doped tin oxide particles;

the supporting layer is a clear polyethylene terephthalate film, and the transport assisting layer on the side opposite to the imaging side contains silica particulates and polymeric binders.

23. A film composite according to claim 22, wherein the polymeric binders of the transport assisting layer are selected from the group consisting of melamine-formaldehyde resins, partially hydrolyzed polyvinyl acetate resins and quaternary salts of acrylamide copolymers.

24. A film composite according to claim 1, 2, 3, 4, 5 or 22, wherein the composite is transparent and possesses a haze value of from 10 to 45 percent.

25. A film composite according to claim 1, wherein the surface abrasivity of the image receptive layer is from 0.03 to 0.07 inch and the surface roughness is from 60 to 150 cc of air/minute.

26. A film composite according to claim 22, wherein the surface abrasivity of the image receptive layer is from 0.03 to 0.07 inch and the surface roughness is from 60 to 150 cc of air/minute.

27. A system for producing an electrostatic hardcopy print, the system comprising:

a writing head having a plurality of styli, a backplate or frontplate electrode, means for placing electronic charges in latent image form on a recording medium, means for applying toner particles to said recording medium, and means for fixing the image on the recording medium, said recording medium comprising:

an image receptive layer having a surface abrasivity of 0.015 inch to 0.085 inch, and a surface roughness of 30 to 180 cc of air/minute;

an electronically conductive layer containing a least one electronically conductive particulate in a polymer binder; and a supporting layer, said image receptive layer being disposed on said electronically conductive layer which is, in turn, disposed on said supporting layer.

28. A system according to claim 27, further comprising a transport-assisting layer on the side opposite to the imaging side of the film.

29. A system according to claim 27, wherein the electronically conductive particulate is a doped metal oxide.

30. A system according to claim 27, wherein the electronically conductive particulate is a metal halide.

31. A system according to claim 27, wherein the electronically conductive particulate comprises a nucleus which is covered by a conductive metal oxide.

32. A system according to claim 27, wherein the image receptive layer contains polymer binders and particulates, and possesses a dielectric constant of 1.5 to 6.5 measured at 25° C. and 1 KHz.

33. A system according to claim 27, wherein the electronically conductive layer possesses a surface resistivity of $1\times10^2$ to $1\times10^8$ ohms/sq.

34. A system according to claim 27, wherein the surface abrasivity of the image receptive layer is from 0.03 to 0.07 inch and the surface roughness is from 60 to 150 cc of air/minute.

* * * * *